Jan. 24, 1933.  LA MONT A. McDOWELL  1,895,199
SPEED GOVERNOR AND DRIVING MECHANISM
Filed Feb. 13, 1932
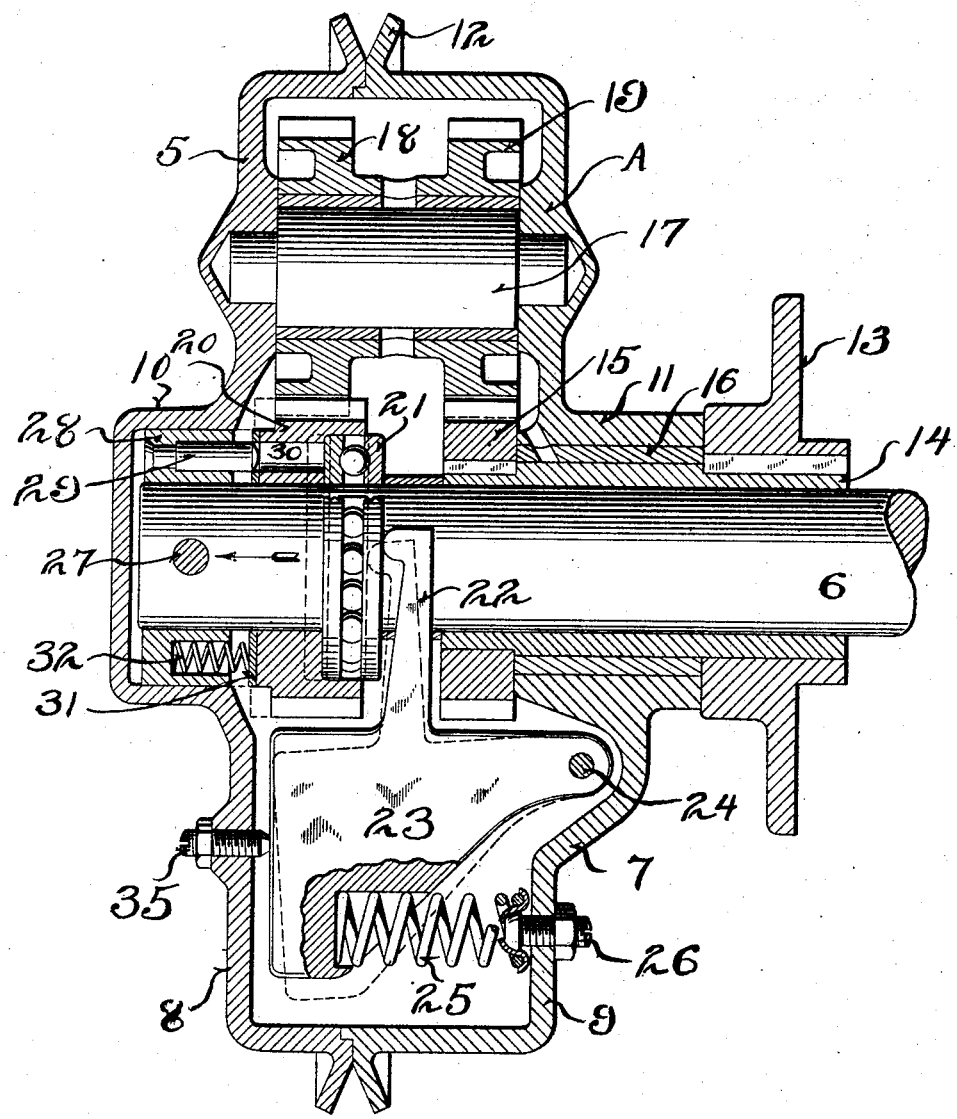
INVENTOR.
LA MONT A. MC DOWELL
BY
ATTORNEY.

Patented Jan. 24, 1933

1,895,199

UNITED STATES PATENT OFFICE

LA MONT A. McDOWELL, OF RACINE, WISCONSIN

SPEED GOVERNOR AND DRIVING MECHANISM

Application filed February 13, 1932. Serial No. 592,728.

This invention appertains to a novel device for operatively connecting a drive and a driven member, and more particularly to a combined speed governor and driving connection, whereby the driven member will be automatically disconnected from the drive member when the speed of the drive member falls below a predetermined number of revolutions per minute.

One of the primary objects of my invention is the provision of a driving connection embodying a rotary drive member rotatably mounted on a driven member shaft, with means including centrifugally operated weights for automatically connecting the drive member with the shaft, whereby the drive and driven members will rotate as a unit when the driven member is accelerated to a predetermined speed.

Another salient object of my invention is the provision of a drive member, which can be in the nature of a pulley, rotatably mounted on a driven shaft, with a novel gear mechanism for connecting the driven member with the shaft, after the drive member has reached a predetermined speed, said gear mechanism including a clutch automatically operated by centrifugal actuated weights for connecting and disconnecting said gear mechanism, with the drive and driven members.

A further object of my invention is the provision of means for rendering the centrifugally actuated weights inoperative, so that a positive driving connection can be had at all times, between the drive and driven members, irrespective of the speed of rotation of the drive member.

A further object of my invention is the provision of novel means for forming the drive element of the device, said drive element being in the nature of a hollow casing rotatably mounted upon the drive shaft, with a novel system of gearing arranged within the hollow housing and operatively connecting the housing with the driven shaft.

A still further object of my invention is to provide a combined speed governor and drive connection between a drive and a driven member, of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, in which:

The figure is a central diametric section through my improved combination speed governor and drive unit.

Referring to the drawing in detail, wherein the letter A generally indicates my improved device, which comprises a drive member 5 and a driven shaft 6. The drive member 5 is in the form of a hollow circular housing 7, which includes inner and outer companion interfitting sections 8 and 9, which can be connected together in any desired way. The housing sections 8 and 9 each carry hub sleeves 10 and 11, respectively, at their axis for receiving the driven shaft 6. The housing 7 can be actuated from a prime mover, or any other operating device, in any preferred way, such as by means of a belt, chain, gears or other mechanical transmission. As shown, the meeting faces of the housing sections 8 and 9 are provided with oppositely curved annular flanges 12, which define a pulley for receiving a pulley belt (not shown).

The driven shaft 6 extends through a supporting plate 13, which can be considered as a bearing bracket, or as part of a supporting housing. Keyed or otherwise secured to the stationary plate 13 is a bearing sleeve 14, in which the shaft 6 is rotatably mounted. Keyed to the inner end of the bearing sleeve 14 is a stationary spur gear 15, and, as shown, this gear 15 is arranged within the hollow drive housing. A spacer or bearing sleeve 16 can be interposed between the bearing sleeve 14 and the casing sleeve 11, if so desired, and means can be provided for lubricating the said driven shaft.

Rotatably mounted within the hollow drive housing 7, at spaced points around the axis thereof, are supporting shafts 17 and these shafts carry connected spur gears 18 and 19. These connected gears 18 and 19 are in the nature of double gears and the part or gear 19 thereof, meshes at all times with the stationary gear 15, and forms a substantially planetary gear arrangement. Obviously, during rotation of the drive housing 7, the gears 19 travelling around the stationary gear 15 will be rotated thereby.

Slidably and rotatably mounted on the driven shaft 6 is a clutch gear 20 which meshes at all times with the gear 18, so as to be driven constantly thereby during rotation of the drive housing 7.

This gear 20 carries a thrust bearing 21 and this thrust bearing is engaged by the arms of a yoke 22 formed on or secured to a centering weight 23. The weight 23 is rockably mounted on a pivot pin 24 connected with the drive housing 7. Thus, during rotation of the drive housing 7, centrifugal action will normally tend to move the weight 23 outward toward the periphery of the drive housing, and, consequently, bring the yoke against the bearing 21 for shifting the gear 20 longitudinally on the shaft 6.

A relatively heavy expansion coil spring 25 is employed for normally resisting the centrifugal action, and the tension of this spring can be adjusted by the use of a suitable set screw 26 or the like.

During comparatively slow rotation of the drive housing 7, centrifugal action on the weights 23 will be insufficient to overcome the tension of the spring 25, but as soon as the rotation of the drive casing reaches a predetermined speed, the centrifugal action on the weights will overcome the tension of the spring and thus shift the gear 20 on its driven shaft 6.

Secured to the driven shaft 6 by the use of a suitable pin 27, or the like, is a clutch section 28, and as shown, this clutch section is rotatably mounted within the hub sleeve 10 of the drive housing 7. The clutch section 28 and the shiftable gear 20 can be provided with any preferred type of clutch faces, so that when the gear 20 is shifted laterally, a driving connection will be had between the gear 20 and the clutch section 28 for bringing about a driving connection between the drive housing 7 and the driven shaft 6.

As shown in the drawing, the clutch section 28 carries drive pins 29 which are adapted to be received within socket openings 30 formed in one face of the gear 20. In order to normally hold the shiftable gear 20 from out of engagement with the clutch section 28, a push ring 31 is provided and this push ring is normally pressed toward the gear 20 by means of expansion springs 32 carried by the clutch sections 28.

As shown, the push ring 31 is provided with openings through which the clutch pins 29 extend. If desired, means can be provided for slidably connecting the push ring with the clutch section 28, whereby the push ring will be held at all times in a predetermined position relative to said clutch section.

In operation of my improved device, the drive housing 7 is rotated in any preferred way, and the gears 18 and 19 are rotated through their engagement with the stationary gear 15. After the drive housing 7 reaches a predetermined speed, the weight 23 will be moved outward by centrifugal force against the tension of spring 25, and the gear 20 will be shifted on the driven shaft 6 into engagement with the clutch section 28 against the tension of the springs 32. The driven shaft 6 will then be rotated by the drive housing 7. After the speed of the drive housing 7 falls below a predetermined rate, the spring 25 will overcome the centrifugal force acting on the weight and return the same to its normal position. The push ring 31 will then function to move the gear 20 back to its normal position, and thus bring about the disengagement of said gear 20 with the clutch section 28.

When it is desired to use the device as a speed or direction changer only without the automatic governor action, a set screw 35 carried by the drive housing 7 can be adjusted into engagement with the weight 23 for moving and holding this weight back against the tension of the spring 25. Obviously, the rocking of the weight 23 by the screw 35 will move the gear 20 into driving contact with the clutch section 28.

The gear mechanism, as shown, permits a speed reduction in this case of 17½ to 1; other ratios can be obtained by changing the number of teeth on the gears. In the present instance, the gear 15 and gear 19 have thirty-six teeth, gear 18 has thirty-five teeth and gear 20 has thirty-seven teeth. Every revolution of housing 5, gear 18 moves gear 20 forward two teeth. If there were thirty-seven teeth in gear 18 and thirty-five teeth in gear 20, the movement would be backward instead of forward; so a mechanism is provided that will greatly reduce the speed in either direction.

The set screw 35 has only been shown by way of illustration for locking the governor, and it is obvious that other mechanism can be employed in lieu thereof, for holding the governor against movement under influence of its spring 25. Thus, a bolt and a spring can be utilized, so that when the bolt is tightened up, for placing the spring under tension, upon turning of the housing, the clutch will snap in place as soon as the pins 29 and holes 30 register.

From the foregoing description, it can be seen that I have provided an exceptionally simple and durable speed control device and drive transmission.

While I have illustrated one particular form of my invention in the drawing, it is to be understood that the scope of the invention is not to be limited to such construction, but that changes can be made therein provided the same do not part from the spirit or the scope of the claims, and what I claim as new is:

I claim:

1. In a combined speed governor and drive transmission, a driven shaft, a hollow drive member rotatable about the driven shaft, a stationary spur gear arranged within the drive housing, pairs of connected gears rotatably carried by the housing and arranged at equally distantly spaced points around the driven shaft, one of the gears of the pair of gears meshing with the stationary gear, a clutch including a stationary section secured to the driven shaft, a shiftable clutch section rotatable about the driven shaft having gear teeth meshing with the other gear of the pair of gears, and means including a movable weight carried by the drive housing for actuating the shiftable section of the clutch.

2. In a combined speed governor and drive transmission, a driven shaft, a hollow drive member rotatable about the driven shaft, a stationary spur gear arranged within the drive housing, pairs of connected gears rotatably carried by the housing and arranged at equally distantly spaced points around the driven shaft, one of the gears of the pair of gears meshing with the stationary gear, a clutch including a stationary section secured to the driven shaft, a shiftable clutch section rotatable about the driven shaft having gear teeth meshing with the other gear of the pair of gears, means including a movable weight carried by the drive housing for actuating the shiftable section of the clutch, and spring means engaging the weight for normally holding the weight against movement under centrifugal action.

3. In a combined speed governor and drive transmission, a driven shaft, a hollow drive member rotatable about the driven shaft, a stationary spur gear arranged within the drive housing, pairs of connected gears rotatably carried by the housing and arranged at equally distantly spaced points around the driven shaft, one of the gears of the pair of gears meshing with the stationary gear, a clutch including a stationary section secured to the driven shaft, a shiftable clutch section rotatable about the driven shaft having gear teeth meshing with the other gear of the pair of gears, means including a movable weight carried by the drive housing for actuating the shiftable section of the clutch, spring means engaging the weight for normally holding the weight against movement under centrifugal action, and means for varying the tension of said spring.

4. In a combined speed governor and drive transmission, a drive housing, a driven shaft rotatably mounted in said housing, a stationary gear disposed about said driven shaft mounted within the housing, a pair of gears rotatably carried by the housing and arranged radially of the driven shaft, one of said pair of gears meshing with the stationary gear, a clutch including a stationary section and a shiftable section, means connecting the stationary section with the driven shaft, the shiftable section being rotatable relative to the driven shaft and having teeth meshing with the other gear of the pair of gears, spring means normally holding the shiftable clutch from out of engagement with the stationary clutch section, a weighted member rockably mounted at one side of the drive housing, arms carried by the weighted member engaging the shiftable clutch section, and spring means engaging the weighted member for normally holding the arm away from the shiftable section.

5. In a combined speed governor and drive transmission, a drive housing, a driven shaft rotatably mounted in said housing, a stationary gear disposed about said driven shaft mounted within the housing, a pair of gears rotatably carried by the housing and arranged radially of the driven shaft, one of said pair of gears meshing with the stationary gear, a clutch including a stationary section and a shiftable section, means connecting the stationary section with the driven shaft, the shiftable section being rotatable relative to the driven shaft and having teeth meshing with the other gear of the pair of gears, spring means normally holding the shiftable section from out of engagement with the stationary clutch section, a weighted member rockably mounted at one side to the drive housing, arms carried by the weighted member engaging the shiftable clutch section, spring means engaging the weighted member for normally holding the arm away from the shiftable clutch section, and releasable means for holding the arms of the weighted member in engagement with the shiftable clutch section against the tension of said spring means.

In testimony that I claim the foregoing I have hereunto set my hand at Racine, in the county of Racine and State of Wisconsin.

LA MONT A. McDOWELL.